March 30, 1965  R. C. VANSTRUM  3,175,935
METHOD OF MAKING REFLECTIVE PARTICLES AND RESULTANT ARTICLE
Filed May 8, 1961

INVENTOR
ROBERT C. VANSTRUM
BY
Carpenter, Abbott, Coulter & Kinney
ATTORNEYS

United States Patent Office 3,175,935
Patented Mar. 30, 1965

3,175,935
METHOD OF MAKING REFLECTIVE PARTICLES AND RESULTANT ARTICLE
Robert C. Vanstrum, White Bear Lake, Minn., assignor to Minnesota Mining and Manufacturing Company, St. Paul, Minn., a corporation of Delaware
Filed May 8, 1961, Ser. No. 108,450
7 Claims. (Cl. 156—3)

This invention relates to a novel method for coating base core members or granules and the articles formed thereby.

The invention provides freely-flowable granules comprising base core members adherently coated with non-tacky solid thermoadhesive particles. These freely-flowable granules, particularly when spherical in shape as is preferred, are useful as a molding material to make porous shapes such as, for example, filters. They also are useful as intermediates in the manufacture of a variety of products. One such product is reflex-reflecting granules of high brilliancy reflection and capable of reflex-reflecting light regardless of its angle of incidence.

Heretofore it has been difficult to manufacture reflex-reflecting granules of very small size inasmuch as the reflex-reflecting combinations, which consist of lens elements (transparent microspheres) and underlying specular reflectors, must be oriented about core particles and bonded in position without bonding adjacent core particles and reflex-reflecting combinations in a mixture of the same into a clump or aggregate, and without destroying the operability of the reflex-reflecting combinations so bonded. Attempts to manufacture small granules by using tacky resin bonds has resulted in agglomeration or clumping of the tacky resin coated cores when the tacky resin is applied over the cores at a satisfactory thickness level to provide a bond for the reflex-reflecting combinations. The reflex-reflecting combinations should be embedded up to about half the diameter of the lens elements employed, and this requires a quantity of resin which inherently causes at least some clumping or agglomeration. Coatings of bond resin insufficiently thick do not retain the lens elements and underlying reflectors against removal.

The present invention provides a novel method of manufacture which solves this problem. The method involves building up the necessary thickness for a binder layer about core members by applying non-tacky thermoadhesive powdered resin particles over tacky resin coated core members to form an intermediate product having utility, among other things, in the manufacture of reflex-reflecting granules.

Figure 1:
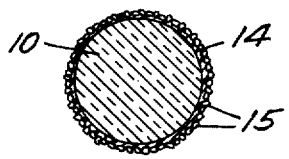
Figure 2:
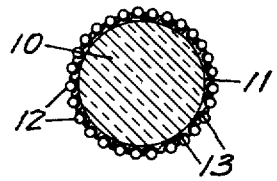

The invention will be described by reference to a drawing, made a part hereof, wherein:

FIGURE 1 is an enlarged cross-section of an illustrative resin coated core of the invention; and FIGURE 2 is an enlarged cross-section of an illustrative reflex-reflecting granule hereof.

As illustrated in FIGURE 2, reflective granules formed according to the process hereof comprise a non-friable core 10 surrounded by a binder layer 11 and reflex-reflecting complexes consisting of transparent microspheres 12 with associated underlying specular-reflectors 13. In forming the reflective granules, resin coated cores are used having the non-friable core 10 surface-coated with a tacky resinous material 14 and overcoated with non-tacky solid thermoadhesive particles 15, as illustrated in FIGURE 1.

The core member 10 is preferably spheroidal inasmuch as it is difficult to coat irregularly shaped cores with a reasonably uniform layer of tacky resinous binder. Irregular projections tend to be starved of tacky coating material. Another reason spheroidal core members are preferred over irregularly surfaced cores such as obtained by crushing lithic materials is that when spheroidal base cores are employed, the resulting resin coated articles tend to be spheroidal and thus more uniform in character. End products of more uniform characteristics are therefore more easily formed.

Usually core members are at least about 5 mils in diameter, although smaller core members may be employed where extraordinarily minute (e.g., minus 400 mesh) non-tacky thermoadhesive resin powder particles are to be bonded to the tacky coating surrounding the cores. Of course, small cores, if used as the base for reflective granules, should be coated with extraordinarily small reflex-reflecting combinations (having a diameter not over about one-half the average diameter of the cores employed). Core preferably do not exceed about 40 or 50 mils diameter. However, cores may be coated satisfactorily using the process hereof even when they are as large as ⅛ inch diameter, or even one-half inch or larger in diameter. Smaller cores up to about 50 mils diameter provide end reflex-reflecting articles which possess greater resistance against dislodgment from a paint strip or resin bond under abrasion conditions, and thus are preferred. Resin coated cores designed primarily for molding uses also are preferably no larger than about 40 or 50 mils in diameter. Since individual cores in a mass thereof will vary in diameter to some extent, as is true with any mass of particles, it sometimes is convenient to refer to the average diameter of cores in a mass, which simply means the statistical average. This is done in the specific example to follow. While the numerical figures for diameter set forth here are not average diameter figures, it must be realized that a few cores outside the limits expressed may be present in a batch without unduly upsetting preferred results, so long as the majority of the mass by weight is within the limits here discussed as preferred. From the standpoint of process, the upper diameter limit for cores is only governed by the ability to conduct the process as described hereinafter. However, the advantages of the process become particularly apparent when handling the smaller core members.

Generally core members are selected for their non-fusible properties under conditions of use to which they are subjected as well as their non-friable properties under conditions of use. Where a reflex-reflecting granule is to be employed as a horizontal marker, the core preferably consists of a transparent glass bead of refractive index of about 1.5 or higher. When such beads are used as cores in combination with pigmented binder for bonding of the reflex-reflecting combinations thereabout, the resulting reflex-reflecting granules will exhibit some measure of "residual" reflex-reflection even after traffic abrasion tears off reflex-reflection complexes and pigmented binder from the upper surface of the core member. In effect, the result of such traffic abrasion provides one, where a transparent bead core and pigmented binder are used, with a "residual" reflex-reflection property analogous to that heretofore gained with reflex-reflecting traffic marking paints.

The binder 11 for reflex-reflecting complexes or combinations surrounding core members is actually formed and consists of two essential parts, as may be observed by referring to the article illustrated in FIGURE 1. The two parts of the binder for the reflex-reflecting complexes are an inherent feature of the process of making reflex-reflecting granules according to the invention. In this process, a layer of tacky resinous material is first applied over the surfaces of core members as a film coating. While only a thin film coating of tacky resinous material is preferred, this film has been found in practice to be of such a nature as to convert a mass of core members, which in the uncoated state are freely-flowable, into a non-freely-flowable state. They in effect clump together into agglomerates so that cores of the mass no longer flow readily past one another when attempt is made to pour the same. No more tacky resinous material than that sufficient to provide a thin film coating and thereby convert the freely-flowable cores into an essentially non-freely-flowable state is necessary. If desired, amounts of tacky resinous material may be adjusted upwardly so long as the layer about core members is not converted into a continuous matrix within which core members remain embedded. Satisfactory film coatings of various thicknesses are reached when the cores tend to clump together as aforementioned and yet are separable into discrete granules by the application of non-tacky particulate over the tacky coatings, as to be discussed.

The next step in manufacture involves application of the non-tacky solid thermoadhesive resin particles over the tacky coated core members. This step is accomplished by mixing the tacky coated core members with sufficient non-tacky solid thermoadhesive resinous particles to essentially completely cover the tacky surfaces of the core members. During this mixing step, the tacky coated cores are gradually converted from the non-freely-flowable state in to articles having the structure illustrated in FIGURE 1 which are again freely-flowable, rolling over one another when poured.

Non-tacky solid thermoadhesive resinous particles useful in the practice of the invention preferably are finely-divided powder particles small enough to pass through a screen of 200 mesh. Indeed, particles on the order of 10 microns or less give excellent results. However, it has been found that relatively large particles present in a mass of thermoadhesive solid particles do not interfere greatly with the conduct of the process so long as smaller sized thermoadhesive particles in the mass are present in sufficient amount to coat tacky surfaced core members during the mixing step. Sufficiently small-sized thermoadhesive particles are those which are at least small enough to pass through a screen of 50 mesh and in no event larger than about one-fifth the diameter of core members upon which they are coated. Any excess of applied solid thermoadhesive resin particles not picked up by the tacky coating on cores during mixing may be removed from the mass of freely-flowable resin coated cores by screening after the coating operation (where the largest particles of thermoadhesive are smaller than the resin coated cores), or by flotation procedures relying on differences in density (where solid resin particles of widely varying size are used including sufficient of the required smaller sized particles).

Resinous materials suitable to employ in forming the freely-flowable resin coated cores hereof may vary widely. For example, the tacky resinous materials may be of low molecular weight and even in a pasty or liquid state. Where freely-flowable resin coated cores designed, for example, for use in molding applications are contemplated, resinous materials having a rubbery character may even be employed. Liquid resins such as liquid epoxy materials are also quite suitable to use. Various ingredients such as flow inhibitors, fillers, etc., may be incorporated in the resinous material or blend to control viscosity or to gain added properties as imparted by the addition. The required tackiness of the tacky resinous material is gained when the film applied upon the core possesses sufficient adhesive power to pick up and retain solid thermoadhesive particles on it. While a wide variety of tacky resinous materials are therefore suitable to employ in fabricating the thin tacky film coating over the core members, it is greatly preferred to employ solvent-diluted tacky resinous materials which increase in tack as solvent is evaporated from the material or blend. It is also preferable to employ resinous materials which are thermosetting in character, such as, for example, epoxy and hardener or curing combinations, phenol-aldehyde addition polymers, etc.

The outer layer of non-tacky solid thermoadhesive resinous particles, as in the case of the underlying tacky layer, preferably is formed of thermosetting resin powder, particularly in cases where strong bonds for added elements on the exterior of the resin coated granule are to be formed. Nevertheless, thermoplastic resinous powdery materials (e.g., vinyls, polyethylenes, etc.) are suitable to employ provided they remain as a solid non-tacky material under the storage temperature conditions to which the tacky coated cores are subjected. Ordinarily this means that a thermoplastic binder not rendered tacky at temperatures below about 100 or 150° F. is suitable to employ. Lacking the stronger bond strength exhibited by thermosetting materials, it is preferable to limit the use of thermoplastics to coated cores which it is expected will be used in applications where any added elements affixed by additional processing upon their outer surface need not be resistant to abrasive removal.

As a specific illustration of the process of the invention and preferred resin coated cores and reflective granules formed according to this process, the following is offered.

Spheroidal transparent glass beads of an average diameter of about 12 mils (varying in diameter from about 8 to about 16 mils) and having a refractive index of about 1.5 are treated with a dilute solution (1% solids in water) of an amino-functional silane such as sold under the trade designation "Z6020" by Dow Corning Corporation. Brief treatment followed by drying is satisfactory. Such treatment is optional, and desired results are achieved without it, particularly when using non-glassy lithic cores, or metal or phenolic cores, either spheroidal or irregular; but the treatment, or any of a variety of other suitable surface active treatments (e.g., vinyl trichlorosilane), may be used to improve adhesion between the glass core and tack resin coating to be applied.

To 100 pounds of dry coated cores under agitation in a mixer are added 4 pounds of a tack resin composition previously blended by roll mixing and satisfying the following composition:

| | Parts by weight |
|---|---|
| Liquid epoxy resin ("Epon 828") | 106 |
| Titanium dioxide pigment (chalk resistant grade) | 66 |
| Isophthalyl dihydrazide (a heat activated hardener for epoxy) | 28 |
| Alkyl ammonium montmorillonite ("Bentone 18C," an organophilic thixotropic flow inhibitor) | 4 |
| Toluene | 7 |
| Solid epoxy resin ("Epon 1001") | 35 |
| Methyl ethyl ketone | 153 |

Epoxy resins are available commercially and have, on the average, more than one 1,2-epoxy group in a molecule. They may be made by the reaction of 2,2-bis(4-hydroxyphenol) propane (i.e., Bisphenol A) and epichlorhydrin in alkaline media at elevated temperatures within the approximate range within 50 to 150° C. In the reaction the Bisphenol A may be replaced in whole or in part by polyhydric phenols, e.g., resorcinol, or polyhydric compounds such as ethylene glycol, etc. Likewise, sources of epoxy radicals other than epichlorhydrin may be employed in the reaction. The "Epon 828" is but an illustrative liquid epoxy resin which melts at about 8 to 12° C., and has an epoxide equivalent of about 190 to 210. In other words, about 190 to 210 grams of this resin contain one gram equivalent of epoxide, i.e., oxirane oxygen. "Epon 1001" is a solid epoxy resin prepared by using less epoxy radical source material than in the case of liquid epoxy resins melting at about 64–76° C. and having an epoxide equivalent of about 450 to 525.

Suitable organophilic thioxotropic flow inhibiting fillers are described in Hauser U.S. Patent No. 2,531,427, here incorporated by reference. It is preferable to disperse flow inhibiting fillers (e.g., alkyl ammonium montmorillonite, colloid silica, etc.) in toluene or the like prior to adding and blending the same with remaining ingredients of the composition.

In blending the foregoing formula, care is taken to maintain the temperature below about 100° F., and addition of the isophthalyl dihydrazide is delayed until passing the mixture about twice through a paint mill for final blending.

Mixing of the core elements with the tack resin is suitably accomplished using mild stirring agitation. After thoroughly dispersing the ingredients in a mixer and coating the core members, a stream of air is directed through the ingredients so as to drive off solvent. As the solvent is removed, a sticky doughy mass of beads with tack coating thereon results. The mass is quite firmly clumped together.

Thereafter, about 15 pounds of a resin powder, previously compounded on a rubber mill and ground under reduced temperature conditions (about 40° F.) to pass through a 200 mesh screen, is added to the clumped material in the mixer. The following is a specific illustrative composition for this resin powder:

| | Parts by weight |
|---|---|
| Solid epoxy resin ("Epon 1004") | 127 |
| Isophthalyl dihydrazide | 10 |
| Finely-divided copper powder pigment | 13 |

"Epon 1004" is a solid epoxy resin of the type aforediscussed. It has a molar ratio of epichlorhydrin to Bisphenol A of about 1.22 and a melting point of about 100° C.

Mixing of the solid non-tacky resin powder with the clumped mass in the mixer is then carried out under violent stirring agitation for about 10 minutes or so until the tack-coated cores are essentially completely covered with a layer of the non-tacky powder resin. During this operation, agglomerates of the tacky-coated core are broken up and the mixture is converted into a relatively free-flowing mass consisting of cores with powdered resin covering the same and held in position by the tacky underlying resin coating. In this manner adequate thickness of binder solids is built up on the core elements so that firm bonding of small reflex-reflecting complexes embedded up to about half their diameter can be achieved. Indeed, by screening out fines and classifying the resin particulate to be added, it is possible to control extremely accurately the thickness of the solid resin particulate layer and therefore the thickness or depth of resin on core elements.

Next, since an excess of non-tacky resin powder is added to the mixer, the material from the mixer is withdrawn and screened to remove such excess powder. It is suitable to use a screen of about 80 mesh, through which the excess powder particles pass, but through which the coated cores do not pass.

The specific product formed as illustrated may be stored or even shipped in commerce and used in a variety of applications as will be discussed. Under room temperature conditions its resin coating (both layers) does not advance or cure appreciably for several months. Of course, if a highly reactive tack coating or solid particulate resin coating is employed, the shelf life of the product may be relatively short at room temperature; therefore, it may be necessary, under such conditions, to store and ship the product under refrigeration.

The next step in forming the composite reflux-reflecting granules hereof involves application of metalloid coated microspheres to the binder coating on the core member. There microspheres consist essentially of transparent glass beads surrounded by a metalloid coating. The transparent glass microspheres will generally have a diameter ranging from about 10 up to about 250 microns, preferably no more than about 75 microns, and have a refractive index which may vary from about 1.7 to about 2.7. Within the range of about 1.7 to 2.7, microspheres having refractive indices of about 1.7 to 2.0 are used where maximum brilliance of reflex-reflection is to be realized under dry conditions, whereas microspheres having refractive indices of about 2.4 to 2.7 are used where maximum reflux-reflection is to be realized under conditions where the microspheres of the granule are coated with a film of water.

A suitable method for forming metalloid coated microspheres is as follows: Charge 1200 pounds of de-ionized water into a stainless steel mixing vessel. Dissolve 12 pounds silver nitrate therein. Add 300 pounds of clean transparent glass microspheres having an average diameter of 50 microns (varying from 30 to 70 microns) and a refractive index of 1.9. Then add 25 pounds of 28% aqueous ammonia solution, 42 pounds of 23.8% water solution of dextrose, and 42 pounds of 15.8% water solution of potassium hydroxide. Stir the contents and allow the reaction to proceed for about 15 minutes in the mixing vessel. Pour the contents in a filter vessel, where the silver-coated microspheres are collected and separated from the solution of other ingredients. Wash the silver-coated microspheres with water and then dry them by vibrating them over a heated plate. Normally, 250 to 300 pounds of glass microspheres may be silvered in a bath as here described, but the size of the batch of microspheres or small beads to be silvered varies depending upon the average diameter of microspheres in the batch, smaller batches being used where beads of smaller and smaller diameter are treated.

Application of silvered microspheres to the non-tacky particulate resin coated cores is accomplished by pouring the coated core material into a large excess of silvered microspheres, and feeding the mixture onto a vibrating conveyor passing through a heating zone. Vibration serves to increase contact of silvered microspheres to the resin coated core members. Heating up to about 230° F. or so is used to soften and tackify the non-tacky particulate resin coating on the core member so as to cause the silver coated microspheres in contact therewith to partially embed themselves within the resin coating on the core member. If desired, either the microspheres or the resin coated cores may be preheated before mixing the two together, but very satisfactory results are gained by delaying major heating until the ingredients are reasonably well blended as described. Preheating of the resin coated core elements to elevated temperatures causing softening and tackification of the particulate resin particles thereof is to be avoided until after the microspheres are blended therewith. Excess beads are removed from the final product at the terminal end of the conveyor by screening, suitably using a screen of about 60 mesh which allows them to pass but retains the granules.

Then, in the case of the thermosetting binder as particularly illustrated in this example, the product from the conveyor is subjected to 300° F. for about 2 hours so as to more fully cure or essentially completely cure the binder resin holding the beads in position about the core member. During this step, the silvered microspheres tend to become more fully embedded up to about one-half their diameter in the binder layer if not earlier drawn into this position by a combination of surface tension forces and pressure applied upon them by contacting adjacent granules of the mass.

Thereafter the material is poured into an excess of a solution formed by adding about 3.4 pounds of potassium dichromate and 11.5 pounds of concentrated sulfuric acid to about 400 pounds of water. About 30 seconds in this solution serves to etch silver from the exposed surface of the partially embedded silver coated microspheres. The product is washed with water and dried (suitably by placing it in an oven for a few hours at an elevated temperature of say 220° F.).

If desired, prior to completely drying the product after washing the etching solution therefrom, other specialized materials may be applied thereto for various purposes.

For example, a dilute solution of an oleophobic fluorocarbon sizing agent such as, for example, a chromium complex of para fluorocarbon carboxylic acid may be applied thereto. Some acids of this general type are described in Reid U.S. Patent No. 2,662,835, issued December 15, 1953, and in Brown U.S. Patent No. 2,934,450, issued April 26, 1960. It is important that only an infinitesimally-thin invisible surface coating be employed in rendering the granules oil repellent and water repellent without preventing adequate bonding of the granules to dried paint films. Such treatments prevent capillation of paint about the reflex-reflecting granules after application of the same in paint films of relatively low viscosity. Problems of capillation and masking over of the reflecting granules may, of course, be avoided by the expedient of employing highly viscous paint films on which to apply the reflecting granules.

Resulting granules, when applied over a paint film as upon an aircraft runway, cause brilliant reflex-reflection of light regardless of the angle at which an incident light impinges thereon, and yet the appearance of the marker during daytime is essentially that of a mere paint film.

Sheet material manufactured according to the teaching in Gebhard et al. U.S. Patent No. 2,326,634, but containing the smaller reflective granules made as taught herein as a replacement for the conventional reflex-reflecting bead complexes disclosed in that patent, exhibit brilliant reflex-reflection regardless of the angle of incident light, and present essentially the type of lenticular surface commonly associated with highly brilliant beaded reflex-reflectors.

While the resin coated cores hereof are especially useful in the manufacture of small reflective granules as specifically illustrated, they also may be used in the manufacture of various granular products having other small particulate material (e.g., pearls, metal flake, irregular particles, etc.) bonded on their outer surface.

That which is claimed is:

1. Freely-flowable granules comprising non-friable cores no greater than about 50 mils in diameter, surrounded by an adherent outer layer of discrete non-tacky solid thermoadhesive thermosettable particles held upon said core members by a substantially continuous tacky resinous layer about said core members and located intermediate said core members and said outer layer of said thermoadhesive thermosettable particles, the thermoadhesive thermosettable particles of said outer layer being at least small enough to pass a screen of 50 mesh and not larger than about one-fifth the diameter of underlying cores.

2. Freely-flowable granules comprising spheroidal non-friable cores no greater than about 50 mils in diameter, surrounded by an adherent outer layer of discrete non-tacky solid thermoadhesive thermosettable particles held upon said core members by a substantially continuous tacky resinous layer about said core members and located intermediate said core members and said outer layer of said thermoadhesive thermosettable particles, the thermoadhesive thermosettable particles of said outer layer being at least small enough to pass a screen of 200 mesh.

3. Freely-flowable granules comprising spheroidal non-friable inorganic cores no greater than about 50 mils in diameter surrounded by an adherent outer layer of discrete non-tacky solid thermoadhesive thermosettable particles, said particles being at least small enough to pass a screen of 50 mesh and not larger than about one-fifth the diameter of underlying cores, and said non-tacky solid thermoadhesive thermosettable particles further being held in position by a tacky binder layer about said cores and located intermediate said thermoadhesive thermosettable particles and said cores.

4. The method of forming freely-flowable granules comprising non-friable core members surrounded by adherent non-tacky solid thermoadhesive thermosettable particles, said method comprising mixing a mass of non-friable freely-flowable core members no greater than about 50 mils in diameter with sufficient tacky resinous material to provide a substantially continuous film coating of said tacky material over the surfaces of said core members and convert said core members into a non-freely-flowable state, and then mixing said tacky coated core members for a sufficient time with sufficient finely-divided non-tacky thermoadhesive thermosettable resinous particles to distribute and bond a layer of said non-tacky resinous particles over the tacky coatings of said core members and render the mass thereof freely flowable, said non-tacky thermoadhesive resinous particles being small enough to pass a screen of 50 mesh and no larger than about one-fifth the diameter of underlying cores.

5. The method of forming freely-flowable granules comprising non-friable spheroidal inorganic core members surrounded by adherent non-tacky solid thermoadhesive thermosettable particles, said method comprising mixing a mass of non-friable freely-flowable spheroidal inorganic core members no greater than about 50 mils in diameter with sufficient tacky resinous material to provide a substantially continuous film coating of said tacky material over the surfaces of said core members and convert said core members to a non-freely-flowable state, and then mixing said tacky coated core members with finely-divided non-tacky thermoadhesive thermosettable resinous particles of a size at least small enough to pass a screen of 50 mesh and not larger than about one-fifth the diameter of underlying core members to which said resin particles are to be adherently bonded, said mixing being continued until said resinous particles are distributed and bonded over the tacky coatings of said core members and render the mass thereof freely flowable.

6. The method of forming reflex-reflecting granules comprising mixing a mass of non-friable freely-flowable core members between about 5 mils and 50 mils in diameter with sufficient tacky resinous material to provide a substantially continuous film coating of said tacky material over the surfaces of said core members and convert said core members into a non-freely-flowable state, mixing said tacky coated core members for a sufficient time with sufficient finely-divided non-tacky thermoadhesive thermosettable resinous particles to distribute and bond a layer of said non-tacky resinous particles over the tacky coatings of said core members and render the mass of said coated cores freely flowable, said thermoadhesive resinous particles being small enough to pass a screen of 50 mesh and no larger than one-fifth the diameter of underlying core members to which said resinous particles are adherently bonded, mixing the thus coated core members with metal coated transparent microspheres between about 10 and 75 microns in diameter under conditions of heat at least sufficient to soften the coating of said core members and partially embed said metal coated microspheres therein, heat-curing the thermosettable material of the coating about said core members, and then etching metal from the exposed surface of said partially embedded microspheres.

7. Reflex-reflecting granules formed by the process of claim 6.

References Cited by the Examiner

UNITED STATES PATENTS

| 2,919,247 | 12/59 | Allen | 252—62.1 |
|---|---|---|---|
| 2,978,351 | 4/61 | Pillar | 117—100 XR |
| 2,991,267 | 7/61 | Bean | 117—100 XR |
| 3,043,196 | 7/62 | Palmquist et al. | 88—82 |

FOREIGN PATENTS

| 594,400 | 3/60 | Canada. |
|---|---|---|

EARL M. BERGERT, *Primary Examiner.*

CARL F. KRAFFT, JACOB H. STEINBERG,
*Examiners.*